(12) United States Patent
Ferdinand et al.

(10) Patent No.: US 6,665,062 B2
(45) Date of Patent: Dec. 16, 2003

(54) INCLINOMETER WITH BRAGG GRATING

(75) Inventors: Pierre Ferdinand, Hovilles (FR); Stéphane Rougeault, Sceaux (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/240,745

(22) PCT Filed: Apr. 10, 2001

(86) PCT No.: PCT/FR01/01091

§ 371 (c)(1),
(2), (4) Date: Oct. 10, 2002

(87) PCT Pub. No.: WO01/77618

PCT Pub. Date: Oct. 18, 2001

(65) Prior Publication Data

US 2003/0095249 A1 May 22, 2003

(30) Foreign Application Priority Data

Apr. 11, 2000 (FR) .............................................. 00 04618

(51) Int. Cl.[7] .......................... G01B 11/26; G01C 1/00; G01C 17/00; G01C 19/00; G01C 9/00
(52) U.S. Cl. ..................................... 356/139.1; 702/154
(58) Field of Search ...................... 356/139.1; 702/154; 385/10; 324/76.37

(56) References Cited

U.S. PATENT DOCUMENTS 6,292,258 B1 * 9/2001 D'Alessandro et al. .... 356/4.08

FOREIGN PATENT DOCUMENTS

| FR | 2 665 529 | 2/1992 |
| JP | 11-344358 | 12/1999 |
| WO | 97 15805 | 5/1997 |
| WO | 99 39214 | 8/1999 |

OTHER PUBLICATIONS

"Interferometric inclinometer for structural monitoring," Inaudi, D.; Glisic, B.; Optical Fiber Sensors Conference Technical Digest, 2002. OFS 2002, 15th, May 6–10, 2002 pp.: 391–394 vol. 1.*
M.G. Xu et al.: "Thermally–compensated bending gauge using surface–mounted fibre gratings" International Journal of Optoelectronics (Incl. Optical Computing & Processing) vol. 9, No. 3, pp. 281–283 May 1, 1994.

* cited by examiner

Primary Examiner—Thomas H. Tarcza
Assistant Examiner—Brian Andrea
(74) Attorney, Agent, or Firm—Oblon, Spivak, McClelland, Maier & Neustadt, P.C.

(57) ABSTRACT

A Bragg grating inclinometer that includes an upper part, a lower part forming a pendulum suspended from the upper part by an articulation, at least two portions of optic fiber placed on either side of the articulation, the ends of each portion being fastened to the two parts, each portion being previously put under tension between the two parts, and at least one Bragg grating in one of the portions. Any variation in the inclination of a structure to which the upper part is fastened induces a stress on the grating, which then modifies a light propagating in the portion where it is placed. The variation in inclination is determined from the modified light. The inclinometer can be applied in particular to the surveillance of civil engineering structures.

12 Claims, 7 Drawing Sheets

INCLINOMETER WITH BRAGG GRATING

TECHNICAL FIELD

The present invention concerns an inclinometer, in other words a device intended to measure inclination variations.

In particular, the invention can be used in mines, drillings, in the civil engineering field, for the surveillance of civil engineering structures (for example bridges and tunnels) and buildings (in particular, historical monuments), and anywhere where a precise control of the stability of a structure is required, particularly over the long term.

STATE OF THE PRIOR ART

Diverse methods of auscultation are customarily used to monitor the amplitude and the rate of distortion, whether horizontal or vertical, of structures, of the surface of the ground and of accessible sub-soil parts in various categories of construction.

Customarily, in civil engineering, instruments called "extensometers" are used to monitor distortions. Various extensometers are commercially available.

As regards rotation measurements, electric inclinometers, also called "tiltmeters" are already known, which are used to monitor the change in inclination of points located on the ground or in the ground or placed on a structure. These inclinometers comprise a sensor that is sensitive to gravity (a pendulum) and arranged in an appropriate housing. Several types of inclinometers are known.

For example, a mechanical inclinometer is known, which comprises a beam and a bubble level, with an adjustment for levelling at one of its ends. This beam is fastened onto two reference spheres anchored on the system to be measured. The levelling adjustment is carried out by adjusting the bubble level and a tachometer dial is used to carry out the measurement. The measurement range is typically several degrees. The precision is approximately ±0.013 millimeters for a beam 200 millimeters long (i.e. around 60 μrad) and is reduced to ±0.13 millimeters for a beam 900 millimeters long (i.e. around 150 μrad).

An inclinometer comprising an accelerometric sensor is also known. The measurement is carried out by placing the inclinometer in a reproducible position on a flat reference piece. One takes a first reading then one turns the sensor by 180° and one then takes a second reading. The flat reference piece is metallic or ceramic and must be securely fastened onto a surface that one wishes to control. The measurement range goes from −30° to +30° and the precision is typically ±250 rad.

Moreover, an inclinometer comprising a pendulum fastened to the upper part of said inclinometer is also known. The inclination of the body of said inclinometer induces bending stresses on one piece. These bending stresses are monitored by two vibrating cord sensors fastened to each side of the piece. In another configuration, the two vibrating cord sensors are fastened between the pendulum and the cover of the inclinometer. This configuration makes it possible, thanks to a differential mounting, to disregard temperature effects.

The measurement range is typically from −0.110 to +0.110 with a precision of around 0.5% of the full scale (around ±10 μrad to ±100 μrad).

Furthermore, an inclinometer comprising an electrolytic level sensor is known. In a first embodiment, a glass measuring cell containing a liquid that conducts electricity (mercury for example) is sealed at its two ends. The measuring precision of this type of sensor is average. Moreover, its thermal sensitivity is high. As a result, it is not very suitable for geotechnical or civil engineering applications.

In a second embodiment, a vacuum is created in the measuring cell. The performance levels are better. Nevertheless, a specific calibration is necessary for each cell and re-calibrations are required. Such inclinometers are expensive, especially when they are used in a network.

We will now consider optic fibre sensors and particularly the advantages of such sensors, such as the insensitivity to electromagnetic perturbations.

First of all, it is worth recalling several facts concerning photo-induced fibre Bragg gratings.

A Bragg grating photo-induced in an optic fibre consists of a periodic structure formed by a modulation of the refraction index of the core of the optic fibre. This type of structure behaves practically like a mirror for a very fine spectral band around a characteristic wavelength $\lambda_B$ (wavelength for which there is a phase tuning between the multiple reflections within the grating) and remains transparent to all other wavelengths. In fact, the multiple waves reflected at these other wavelengths are not in phase, interfere destructively in reflection and are thus transmitted.

The characteristic wavelength, called "Bragg wavelength", is defined by Bragg's law:

$$\lambda_B = 2 N_{eff} \Lambda$$

where $\Lambda$ is the pitch of the effective index network $n_{eff}$.

The final characteristics of a photo-induced Bragg grating depend on the induction parameters such as the type of laser (wavelength, operating conditions) and the luminous intensity used, the wavelength $\lambda$ at which this network is induced, the effective index $n_{eff}$ of the optic fibre in which it is induced, the amplitude of the modulation or variation of index $\Delta n$ and the period $\Lambda$ of said index variation.

These parameters determine the characteristic magnitudes of the Bragg grating, namely: the Bragg wavelength $\lambda_B$, the reflectivity $R_{max}$ at $\lambda_B$, and the width at mid-height of the reflectivity peak, as well as the propensity of the grating to withstand large temperature variations or considerable extensions, which is an important aspect for the use of said Bragg grating as a transducer.

We will now consider such a Bragg grating transducer. Given Bragg's law that characterises this grating, the characteristic wavelength $\lambda_B$ depends on the temperature and the stresses ($\sigma x$, $\sigma y$, $\sigma z$) applied to the fibre in which the grating is formed.

It is normal to separate the three contributions, namely the temperature variations $\Delta T$, the extensions $\epsilon = \Delta L/L$ along the axis of the core of the fibre and the hydrostatic pressure variations $\Delta P$, according to the equation:

$$\Delta \lambda_B / \lambda_B = a' \cdot \Delta T + b' \cdot \epsilon + c' \cdot \Delta P$$

where a', b' and c' are coefficients that depend on the characteristics of the fibre and, to a lesser extent, on its temperature. In practice, they can be assimilated to constants, independent of the temperature, over a large range of operation.

Thus, a precise measurement of $\Delta \lambda_B$ (variation of $\lambda_B$ compared to an initial reference) makes it possible to determine the amplitude of the variation of the phenomenon that has induced this variation of $\lambda_B$. Beyond its simple role as a spectral filter, the Bragg grating thus constitutes a "transducer", since it transforms the changes in an influence quantity into a spectral shift proportional to these changes.

We will now consider the response of the Bragg grating to a temperature variation. When the grating is subjected to such a variation, it dilates or contracts, which modifies its pitch. Moreover, since the refractive index of a material depends also on the temperature, these two phenomena bring about a variation $\Delta\lambda_B$ of the characteristic wavelength such that:

$$\frac{\Delta\lambda_B}{\lambda_B} = \frac{\Delta(n\Lambda)}{n\Lambda} = \left[\frac{1}{\Lambda}\frac{d\Lambda}{dT} + \frac{1}{n}\frac{dn}{dT}\right]\Delta T = a' \cdot \Delta T$$

In the case of silica, the coefficient a' is substantially equal to 7.8 $10^{-6}/°$ C.

By making $a=a'.\lambda_B$, one can then state:

$$\Delta\lambda_B = a.\Delta T$$

We will now consider the response of the Bragg grating to these distortions. As we have seen, stresses are also likely to modify the characteristic wavelength of the grating.

We can define the variation of the Bragg wavelength as a function of an extension as follows:

$$\frac{\Delta\lambda_B}{\lambda_B} = \left(1 - \frac{n_e^2}{2}(p_{11} - \nu(p_{11} + p_{12}))\right)\varepsilon_z = (1 - p_e) \cdot \varepsilon_z = b' \cdot \varepsilon_z$$

Where $n_e$, $\epsilon_z$, E, $\nu$ and $p_e$ respectively represent the optical index of the core of the fibre, the relative variation of the length of the fibre (distortion along the axis z of the fibre), the Young modulus, the Poisson ratio and the photo-elastic constant of the material making up the fibre; $p_{11}$, and $p_{12}$ are opto-elastic coefficients. Taking the example of silica, the coefficient b' equals around $0.78\times10^{-6}/(\mu m/m)$.

By making $b=b'. \lambda_B$, one can then state:

$$\Delta\lambda_B = b.\epsilon_z$$

We will now consider the response of the Bragg network to a pressure variation $\Delta P$. The spectral response of the Bragg ray to this variation may be stated as: $\Delta\lambda_B/\lambda_B=c'. \Delta P$.

For silica, the coefficient c' is equal to around $-2.87\times10^{-6}$/MPa.

The sensitivity values of photo-induced fibre Bragg gratings in silica optic fibres are shown in Table 1, for the most important parameters (temperature, distortions and pressure), for the three principal wavelengths used.

TABLE I

| Sensitivity | $\lambda = 0.83\,\mu m$ | $\lambda = 1.3\,\mu m$ | $\lambda = 1.55\,\mu m$ |
|---|---|---|---|
| Thermal sensitivity (pm/° C.) | 6.5 | 10.1 | 12.1 |
| Sensitivity to distortions (pm/$\mu\epsilon$) | 0.65 | 1.01 | 1.21 |
| Sensitivity to hydrostatic pressure (pm/MPa) | -2.4 | -3.7 | -4.5 |

An optic fibre containing such Bragg gratings can thus be used as a distortion sensor. The measuring system for these distortions can then comprise a wide spectrum light source and a spectral analysis system (for example a spectrophotometer or Fabry-Perot type interferometric cavity) or a narrow scanning source (tunable laser type). The addition of reference Bragg gratings enables an absolute spectral positioning of the wavelength peaks that are reflected by the measuring Bragg gratings.

DESCRIPTION OF THE INVENTION

The aim of the present invention is an inclinometer that is insensitive to electromagnetic perturbations and which, in order to achieve this, uses one or a plurality of optic fibres as well as at least one Bragg grating as transducer.

Moreover, in the invention, spectral type measurements make it possible to disregard light intensity fluctuations.

More precisely, the aim of the present invention is an inclinometer intended to measure an inclination variation of a structure, said inclinometer being characterised in that is comprises:

an upper part intended to be rendered rigidly integral with the structure so that the inclination of said upper part varies like that of the structure, a lower part intended to be located below the upper is part, an articulation of the lower and upper parts, the lower part forming a pendulum freely suspended from the upper part by this articulation, at least two portions of optic fibre placed on either side of said articulation, each portion of optic fibre having first and second ends which are respectively fastened to the lower and upper parts and which are previously put under tension between these lower and upper parts, and at least one Bragg grating, this Bragg grating being formed in one of the two portions of the optic fibre, any variation in the inclination of the structure provoking a rotation of the upper part in relation to the lower part and inducing, as a result, a stress on the Bragg grating, said Bragg grating then being suited to modify a light that propagates in the portion of optic fibre where said Bragg grating is located, the variation in the inclination of the structure being determined from the light thereby modified.

According to a preferred embodiment, the inclinometer according to the invention comprises at least two Bragg gratings, said two Bragg gratings being respectively formed in the two portions of optic fibre and thus undergoing respectively a tensile stress and a compressive stress during the variation of inclination of the structure, said Bragg gratings making it possible to carry out a differential measurement of the wave length, the inclinometer then being insensitive to variations in ambient temperature and pressure.

The articulation of the lower and upper parts of the inclinometer according to the invention may comprise an axis of rotation intended to be arranged horizontally during the inclination variation measurement.

According to a specific embodiment of the inclinometer of the invention, the articulation of the lower and upper parts has at least two degrees of freedom of rotation, said inclinometer comprising at least three portions of optic fibre put under tension and placed around said articulation and at least two Bragg gratings, said two Bragg gratings being respectively formed in two of the three portions of optic fibre, the inclinometer then being provided for measuring an inclination variation definable by two angles of rotation. It is more advantageous to form a third Bragg grating in the third portion of optic fibre, in order to obtain a third measurement, used to compensate the effect of temperature.

In the case of this specific embodiment, the three portions of optic fibre may, for example, be arranged at 120° in relation to each other around the articulation.

In this same case, the inclinometer may comprise four portions of optic fibre put under tension and arranged at 90° in relation to each other around the articulation, and in addition at least two Bragg gratings, said two Bragg gratings being respectively formed in two of the four portions of optic fibre, and making it possible to measure respectively the two angles.

In this latter case, the inclinometer can comprise four Bragg gratings which are respectively formed in the four portions of optic fibre, each Bragg grating being associated with the Bragg grating that is opposite to it in relation to the articulation, said associated Bragg gratings enabling a differential measurement of the wavelength, the inclinometer then being insensitive to variations in ambient temperature and pressure.

The articulation having at least two degrees of freedom of rotation can comprise a spherical joint or a Cardan type suspension, or even a point pressing on a hard surface.

The inclinometer according to the invention can comprise a single optic fibre to which belongs each portion of optic fibre.

In this case, one can use a plurality of inclinometers according to the invention, these inclinometers being assembled in series by the intermediary of the optic fibre.

The inclinometer according to the invention can, in one specific embodiment, be interrogated in reflection, by at least one of the ends of the optic fibre in which is or are formed the Bragg grating(s).

BRIEF DESCRIPTION OF THE DRAWINGS

The present invention will be more clearly understood on reading the descriptions of embodiments that are given below solely by way of indication and in nowise limititative, and by referring to the appended drawings in which.

DETAILED DESCRIPTION OF SPECIFIC EMBODIMENTS

Figure 1:
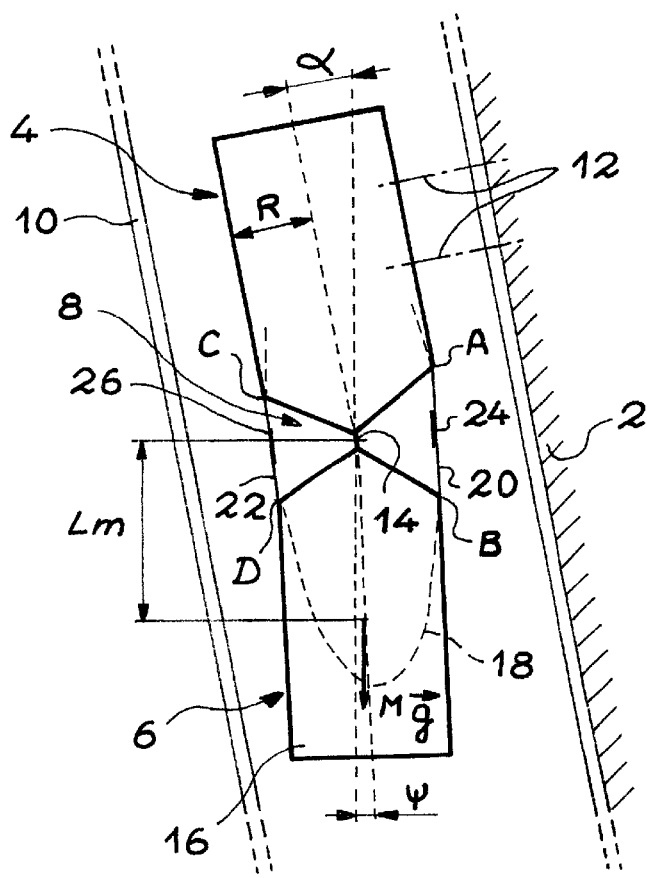
FIG. 1 schematically illustrates the principle of a specific embodiment of the inclinometer according to the invention.

An inclinometer according to the invention is shown schematically in FIG. 1.

This inclinometer is intended to measure an inclination variation in a structure. In the example shown, this structure is a wall 2 of a building. It is assumed that the wall was initially vertical (zero inclination angle) and that it is inclined by an angle α (towards the left in FIG. 1).

The inclinometer comprises an upper part 4 and a lower part 6 as well as an articulation 8 of said parts 4 and 6. The inclinometer also comprises a hollow body 10 in which are located parts 4 and 6 and the articulation 8.

The body 10 is provided with means 12 for fastening to the wall 2. The upper part 4 is fastened to the body 10 and thus moves with the environment of the inclinometer (the wall 2 in the example considered).

The articulation 8 comprises a rotation axis 14 and the lower part 6 (placed below the upper part 4) comprises a mass 16 of value M. It is thus sensitive to gravity, characterised by a vector g and tends to remain orientated vertically. Thanks to the mass 16, the lower part forms a pendulum freely suspended from the upper part through the intermediary of the axis of rotation 14.

The inclinometer also comprises an optic fibre 18. Two portions 20 and 22 of this fibre are placed on either side of the axis of rotation 14. Moreover, the ends A and B of the portion of fibre 20 are fastened respectively to the upper and lower parts of the inclinometer. In the same way, the ends C and D of the portion of fibre 22 are respectively fastened to these upper and lower parts.

A Bragg grating 24 is photo-induced in the core of the portion of fibre 20 and a Bragg grating 26, identical to the grating 24, is photo-induced in the core of the portion of fibre 22. One thus has two Bragg gratings mounted in opposition.

Said mounting in opposition enables a differential measurement of the wavelength.

Beforehand (in other words before fastening the body 10 of the inclinometer to the wall 2), the portions of fibre 20 and 22 are put under tension while fastening them to the lower and upper parts, said two parts being maintained orientated vertically during this placing under tension and making these fastenings. One thus avoids any bends in the fibre between the lower and upper parts.

The principle of the inclinometer in FIG. 1 is to transform the rotation of angle α that it undergoes into a level of stress that is proportional to the angle α and applied to the Bragg gratings.

It should be noted that, in the example in FIG. 1, a tensile stress is applied to the Bragg grating 20 and a compressive stress is applied to the Bragg grating 22.

We will now evaluate the response of the inclinometer in FIG. 1 as a function of its mechanical parameters.

The stress induced in the portions of fibre 20 and 22 by the pre-tensioning of said fibres is designated $\epsilon_0$, while $\epsilon_1$ designates the stress induced by the rotation of angle α on the Bragg grating 20 and $\epsilon_2$ designates the stress induced by this rotation on the Bragg grating 22.

It is assumed that the ambient temperature varies from $T_0$ to $T_0 + \Delta T$ during the measurement.

By the intermediary of the optic fibre 18, one measures $\Delta\lambda_1 - \Delta\lambda_2$ where $\Delta\lambda_1$ (respectively $\Delta\lambda_2$) is the difference between the Bragg wavelength of the grating 20 (respectively of the grating 22) when the temperature is equal to $T_0 + \Delta T$ and the stress applied equals $\epsilon_0 + \epsilon_1$ (respectively $\epsilon_0 + \epsilon_2$) and the Bragg wavelength of said grating 20 (respectively said grating 22) when the temperature is equal to $T_0$ and the stress equals $\epsilon_0$.

Thanks to the relationships given above, one can state:

$$\Delta\lambda_1 - \Delta\lambda_2 = [\lambda_1(\varepsilon_0 + \varepsilon_1, T_0 + \Delta T) - \lambda_1(\varepsilon_0, T_0)] -$$
$$[\lambda_2(\varepsilon_0 + \varepsilon_2, T_0 + \Delta T) - \lambda_2(\varepsilon_0, T_0)]$$
$$= b \cdot \varepsilon_1 + a \cdot \Delta T - (b \cdot \varepsilon_2 + a \cdot \Delta T) = b \cdot (\varepsilon_1 + \varepsilon_2)$$

Since the inclinometer is FIG. 1 is symmetrical, $\varepsilon_1$ and $\varepsilon_2$ have the same absolute value, which is designated $\varepsilon$, but have opposite signs, and the result of the measurement equals 2. b. $\varepsilon$.

This inclinometer is thus intrinsically insensitive to ambient temperature variations.

We would show, in the same way, that it is intrinsically insensitive to ambient pressure variations.

Let us consider the behaviour of portions 20 and 22 of the optic fibre 18 under stress.

Said optic fibre 18 is used in its elastic zone, in accordance with Hooke's law:

$$\frac{\Delta L_f}{L_f} = \varepsilon = \frac{F}{S_f \cdot E_f}$$

where:

$L_f$: Length of each portion of the fibre 20 and 22 having rotation of angle $\alpha$ $\Delta L_f$: Extension of the portion of fibre 20, induced by the rotation of angle $\alpha$ (the portion of fibre 22 then undergoing a contraction $\Delta L_f$).

$E_f$: Young's modulus of the fibre 18

$S_f$: Section of the fibre 18

F: Force applied to each portion of fibre.

Figure 2:
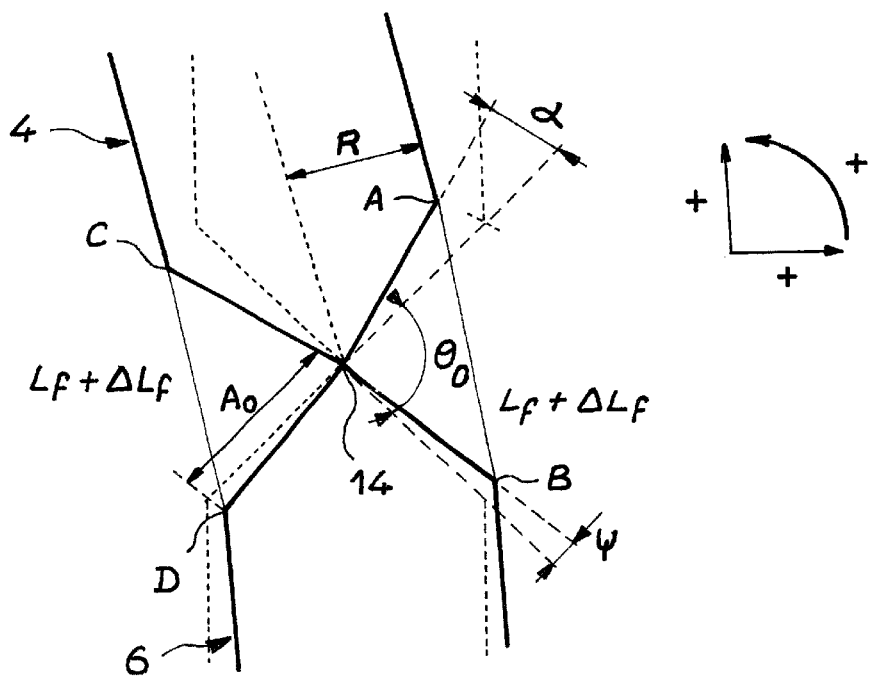
FIG. 2 schematically illustrates the central part of the inclinometer of FIG. 1.

$L_f$ and $\Delta L_f$ can be calculated geometrically. Let us consider the central part of the inclinometer in FIG. 1 (see FIG. 2). At rest (in other words before the rotation of angle $\alpha$) the angle between the stretched part of the fibre and the axis of rotation has a value $\theta_0$. After rotation of the upper part 4, the value of this angle becomes $\theta_0 + \alpha - \Psi$.

We can express $L_f$ as a function of $A_0$, which represents the distance between the axis of rotation and the lower fastening point B (respectively D) of the fibre 20 (respectively 22) in FIG. 1, and of $\theta_0$:

$$L_f = 2 \cdot A_0 \cdot \sin\left(\frac{\theta_0}{2}\right) \quad (1)$$

Under stress, $L_f$ becomes (for the portion of fibre 20)

$$L_f + \Delta L_f = 2 \cdot A_0 \cdot \sin\left(\frac{\theta_0 + \alpha - \Psi}{2}\right) \text{ OR } L_f + \Delta L_f = 2 \cdot A_0 \cdot \sin\left(\frac{\theta_0 + \Delta\theta}{2}\right)$$

The derivation of the equation (1) gives:

$$\Delta L_f = 2 \cdot A_0 \cdot \left(\frac{\Delta\theta_0}{2}\right) \cdot \cos\left(\frac{\theta_0}{2}\right) \text{ OR } \Delta L_f = 2 \cdot A_0 \cdot \left(\frac{\alpha - \Psi}{2}\right) \cdot \cos\left(\frac{\theta_0}{2}\right)$$

One deduces from this:

$$\varepsilon = \frac{\Delta L_f}{L_f} = \frac{A_0 \cdot (\alpha - \Psi) \cdot \cos\left(\frac{\theta_0}{2}\right)}{2 \cdot A_0 \cdot \sin\left(\frac{\theta_0}{2}\right)} \text{ OR } \varepsilon = \frac{(\alpha - \Psi)}{2 \cdot \tan\left(\frac{\theta_0}{2}\right)} \quad (2)$$

We can now express $\theta_0$ as a function of the geometry of the inclinometer parts in FIG. 1 (see FIG. 2):

$$\tan\left(\frac{\theta_0}{2}\right) = \frac{L_f}{2R}$$

AND, AS A RESULT:

$$\varepsilon = (\alpha - \Psi) \cdot \frac{R}{L_f} \quad (3)$$

This relationship allows us to determine the values of R and $L_f$, which makes it possible to obtain the required range and resolution. The angle $\Psi$ is not known and, in order to determine it, we state the balance equation of the inclinometer.

This inclinometer can be assimilated to a rotation system. At equilibrium, we can state that the sum of the moments of the forces that are applied to it is zero.

However, we know that:

the mass (see FIG. 1) M induces a moment: M. g. $L_m$. $\sin(\Psi)$ the Bragg grating 20 is under stress and induces a moment $M_{20}=(F_0+F_1) \cdot R$ the Bragg grating 22 is under stress and this grating induces a moment $M_{22}=-(F_0+F_2) \cdot R$ where $F_0$ represents the module of the pre-stressed force and $F_1$ is equal to $F_2$ and the module common to these two forces is given by Hook's law and thus equals $S_f \cdot E_f \cdot \varepsilon$.

One disregards friction on the axis of rotation.

The balance equation is then:

$$M \cdot g \cdot L_m \cdot \sin(\Psi) =$$
$$(F_0 + F_1) \cdot R - (F_0 + F_2) \cdot R \text{ or } M \cdot g \cdot L_m \cdot \sin(\Psi) = (F_1 - F_2) \cdot R$$
$$\text{or:} \quad : M \cdot g \cdot L_m \cdot \sin(\Psi) = 2 \cdot (\alpha - \Psi) \cdot \frac{R^2}{L_f} \cdot S_f \cdot E_f$$

At the first order, one thus obtains for small angles:

$$M \cdot g \cdot L_m \cdot \sin(\Psi) = 2 \alpha \cdot \frac{R^2}{L_f} \cdot S_f \cdot E_f - 2 \cdot \Psi \cdot \frac{R^2}{L_f} \cdot S_f \cdot E_f \text{ or}$$

$$\alpha = \Psi \cdot \left[\frac{M \cdot g \cdot L_m + 2 \cdot R^2 \cdot \frac{S_f}{L_f} \cdot E_f}{2 \cdot R^2 \cdot \frac{S_f}{L_f} \cdot E_f}\right]$$

or $\alpha = \psi \cdot [1X]$ whith $$X = \frac{M \cdot g \cdot L_m \cdot L_f}{2 \cdot R^2 \cdot S_f \cdot E_f}$$

By using equation (3), one deduces from this:

$$\varepsilon = \left(\alpha - \frac{\alpha}{1+X}\right)\frac{R}{L_f} = \left(-\frac{X}{1+X}\right)\frac{R}{L_f}\cdot\alpha$$

One thus obtains:

$$\varepsilon = \left[\frac{M\cdot g\cdot L_m\cdot L_f}{M\cdot g\cdot L_m\cdot L_f + 2\cdot R^2\cdot S_f\cdot E_f}\right]\cdot\frac{R}{L_f}\cdot\alpha \quad (4)$$

$\varepsilon/\alpha$ can be expressed in [($\mu$m/m)/$\mu$rad] or in [($\mu$m/m)/degree] and represents the sensitivity of the inclinometer, 1 $\mu$m/m generally designating a micro-distortion, noted $1\mu\varepsilon$ (or $\mu$strain).

Thanks to this relationship (4), we can predict the behaviour of such an inclinometer and determine the mechanical parameters that make it possible to obtain the desired metrological characteristics.

Figure 3:
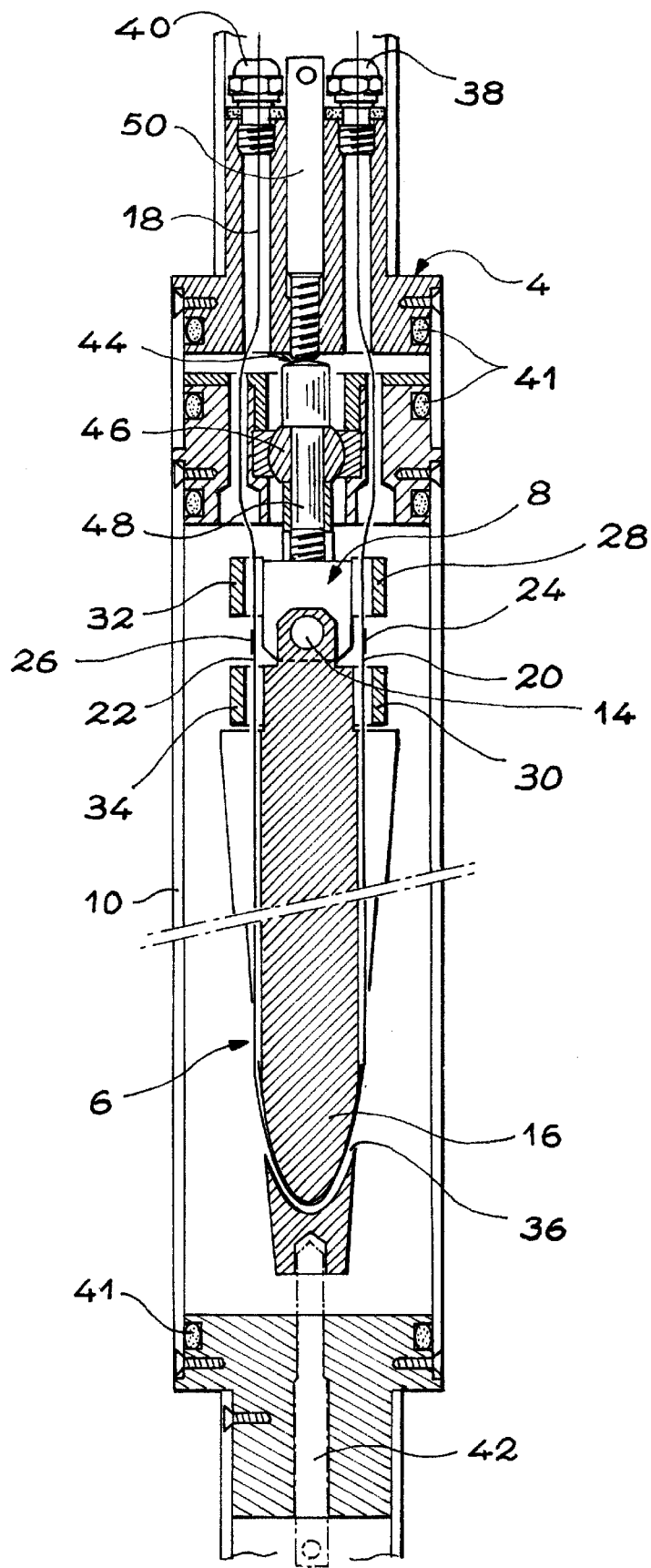
FIG. 3 is a schematic longitudinal section of a specific embodiment of the inclinometer according to the invention.

FIG. 3 is a schematic, longitudinal section of an inclinometer according to the invention. In this FIG. 3, the upper part 4 of the inclinometer, the lower part of the inclinometer, comprising a mass 16 that acts as a pendulum, the articulation 8 comprising an axis 14, are again shown. Said axis is mounted on a precision ball-type bearing (not shown).

One can also see the hollow body 10 which contains the parts 4 and 6, said part 4 being fastened to this body.

The means of fastening this body to a structure on which one wishes to measure the inclination variations are not represented.

Moreover, one can see the optic fibre 18 as well as the portions 20 and 22 of this fibre, comprising respectively the Bragg gratings 24 and 26.

The portion of fibre 20 is pre-tightened by the intermediary of two fastening or bonding systems, or even two jaws 28 and 30 that are respectively fastened to the upper and lower parts. In the same way, the portion of fibre 22 is pre-tightened by the intermediary of two jaws 32 and 34 that are respectively fastened to the upper and lower parts.

The lower part of the optic fibre 18 passes through a curved hole 36 formed in the mass 16. Moreover, the optic fibre 18 penetrates the inclinometer via an entry opening 38 and comes out again via an exit opening 40, said openings 38 and 40 being fastened to the upper part of the inclinometer.

One can also see several leak-proof joints 41 and, at the base of the body 10, a means of security 42 provided to immobilise the mass 16 while the inclinometer is transported.

The inclinometer in FIG. 3 comprises in addition a system of origin angle shift, intended to replace the mass 16 vertically for taking measurements when the body 10 of the inclinometer is not vertical and lies, for example, against a sloping wall. A specific example of such a system of origin shift may comprise the system 44, which essentially comprises a pierced ball 46 that is mounted in a cage leaving this pierced ball, or spherical joint, free in rotation as well as an axis 48 which passes through the ball 46. The lower part of this axis 48 is linked to the upper part of the articulation 8 whereas the upper part of the axis 48 can be moved, thanks to an adjustment pin 50.

It should be pointed out that the adjustment of the system 44 may be carried out either before mounting the inclinometer on the structure on which one wishes to measure inclination variations, or after fastening depending on the ease of access.

In the case of the inclinometer in FIG. 3, we have highlighted a mechanical hysterisis effect. This effect can be corrected by using the principle of differential measurement that was given above.

We will now return to the differential assembly mentioned above.

Since the Bragg gratings are sensitive to temperature, pressure and stretching, said differential assembly makes it possible to disregard variations in temperature and pressure. In the following, we will only consider temperature since, firstly, the pressure effects are virtually negligible and, secondly, the principle of correction relating to pressure is identical.

Figure 4:
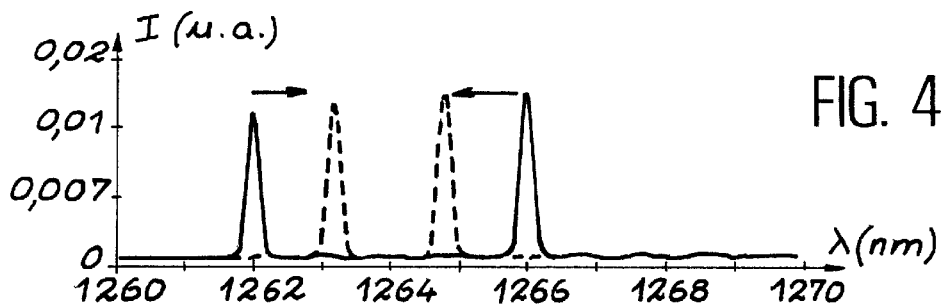
FIGS. 4, 5 and 6 are graphs that respectively illustrate the effect of a simple rotation, the effect of a simple temperature variation and the combined effect of a rotation and a temperature variation in an embodiment of the inclinometer according to the invention.
Figure 6:
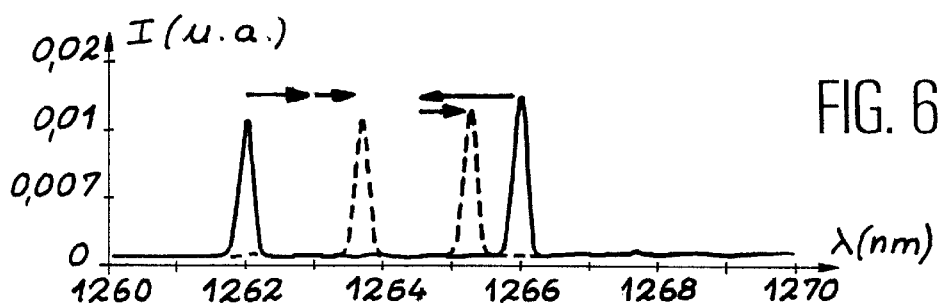

FIGS. 4 and 6 illustrate the compensation of temperature variations with an inclinometer of the type shown in FIG. 3, which uses a differential assembly.

In these figures, the wavelength $\lambda$ (expressed in nm) is along the horizontal axis and the light intensity I (expressed in arbitrary units) is along the vertical axis.

Under the effect of a single rotation, the wavelengths of the peaks of the Bragg gratings shift in opposite senses since one of the gratings is lengthened and the other is shortened (FIG. 4, where the rotation is around 1.5°).

Figure 5:
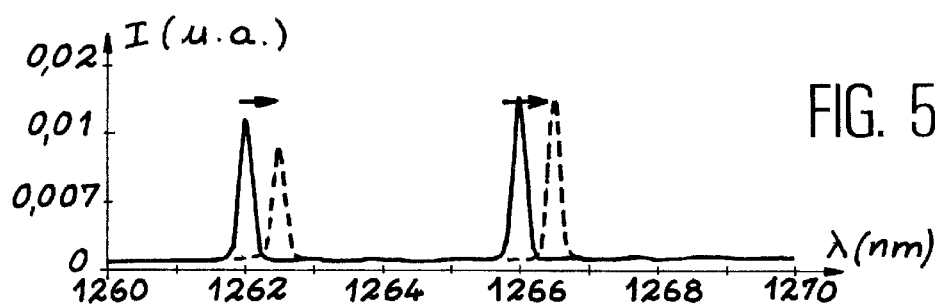

Under the effect of a temperature variation, the wavelengths of the peaks of the Bragg gratings shift in the sane sense (FIG. 5, where the temperature varies by around 50° C.).

Under the combined effect of the rotation and the temperature variation, the differential assembly enables this variation to be compensated (FIG. 6).

The illustration of this temperature compensation may be seen with the help of the inclinometer response curves ($\varepsilon$ expressed in $\mu$m/m as a function of $\alpha$ expressed in degrees).

These curves are formed in two stages, with two different temperatures, namely 22° C. and 40° C.

Figure 7:
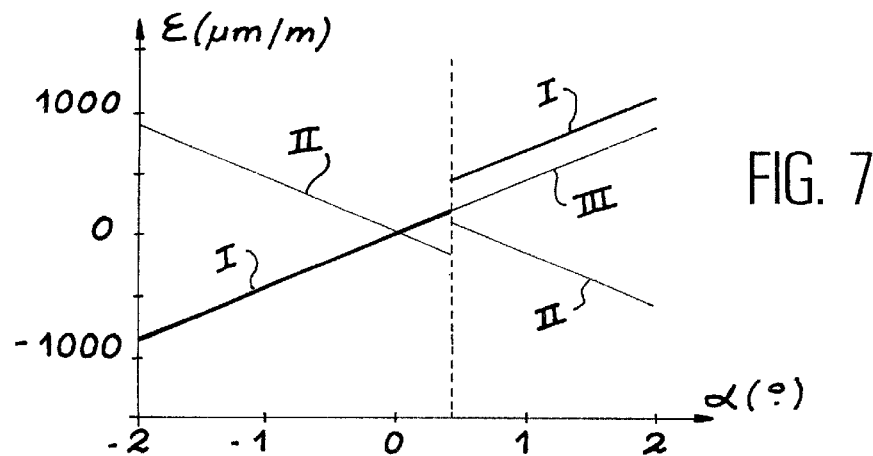
FIG. 7 is a graph that schematically illustrates the compensation of a temperature variation in an embodiment of the inclinometer according to the invention.

On the left hand side of FIG. 7, the two gratings at 22° C. react with opposite slopes (Curves I and II). On the right hand side of FIG. 7, the temperature has increased up to 40° C. and leads to a shift of the two curves. The response of the inclinometer, where the effect of temperature has been corrected, corresponds to Curve III.

Figure 8:
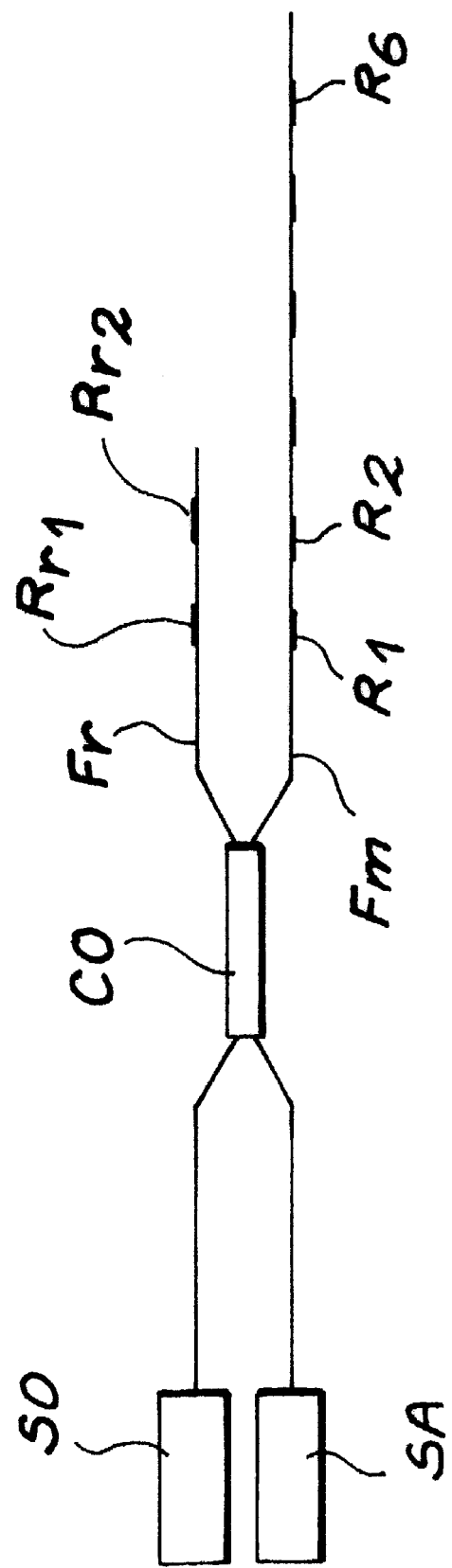
FIG. 8 is a schematic view of a system comprising six transducer Bragg gratings and two reference Bragg gratings.

FIG. 8 schematically shows an example of a measuring system containing six Bragg measuring gratings $R_1$, $R_2$ ... $R_6$.

Also shown are an optic source SO and a spectral analysis system SA, which are linked via an optic coupler CO, on the one hand to an optic measurement fibre $F_m$, in which are photo-induced the Bragg measurement gratings $R_1$ to $R_6$, and secondly to an optic reference fibre $F_r$ in which are photo-induced two Bragg reference gratings $Rr_1$ and $Rr_2$.

The spectral analysis of light reflected by said Bragg gratings may be carried out by two methods. The first method, called reflection method, consists in detecting a bright spectral ray retroreflected towards the source. A second method, called transmission method, consists in detecting a black ray in the transmitted light. The preferred method is the reflective method. Moreover, it makes it possible, if the fibre is broken, to reconstitute all of the spectral information, providing that an interrogation by each of the ends of said fibre are provided for, either with the help of an optic fibre switch alternatively linking the measuring system to each of the ends, or with the help of two measuring systems operating alternately.

We will now return to FIG. 8. The Bragg rays of the two reference gratings are measured beforehand: their spectral difference sets the scale factor of the measuring system. One only has to apply said scale factor to the spectra acquired on the fibre or measuring branch to obtain, by a simple rule of three, the wavelengths associated with each of the measuring gratings $R_1$ to $R_6$.

Figure 9:
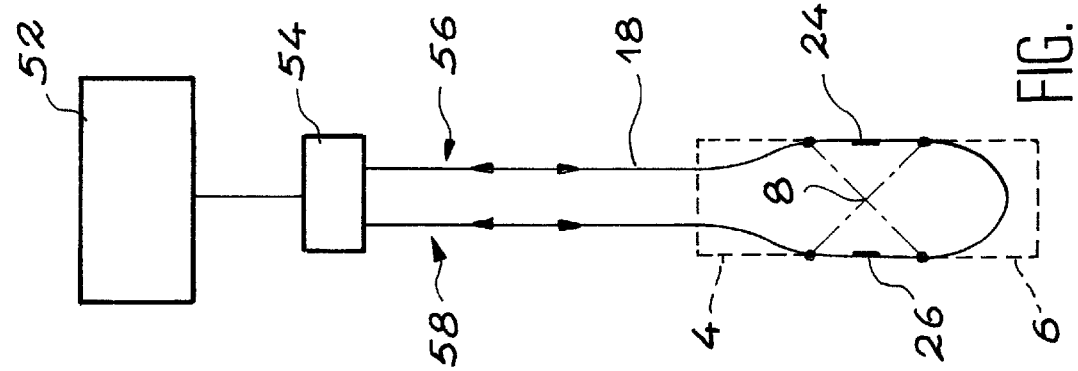

FIG. 9 shows a system for measuring inclination variations that incorporates the inclinometer of FIG. 1 (or FIG. 3). This system comprises means of measuring 52 that enable the Bragg gratings to be "interrogated" and to measure the inclination variations.

Said means of measuring 52 are provided to send, in the optic fibre 18, a light spectrum containing at least the different wavelengths $\lambda_1$ and $\lambda_2$.

Under the effect of an inclination variation, each of the Bragg gratings 24 and 26 modifies the wavelength of the light that they reflect respectively, then this light returns to the means of measuring 52 via the optic fibre.

The inclination variation is determined by these means of measuring from the spectral variations of the light thereby modified.

In the example shown in FIG. 9, the means of measuring 52 are linked to the optic fibre via an optical switch 54 that makes it possible to alternate the interrogation (sending out and recovering light) of the Bragg gratings, said interrogation taking place alternately by a side 56 of the optic fibre then by the other side 58 of said fibre and so on, which enables all of the useful spectral information to be reconstituted even if the optic fibre is broken at any point.

Figure 10:
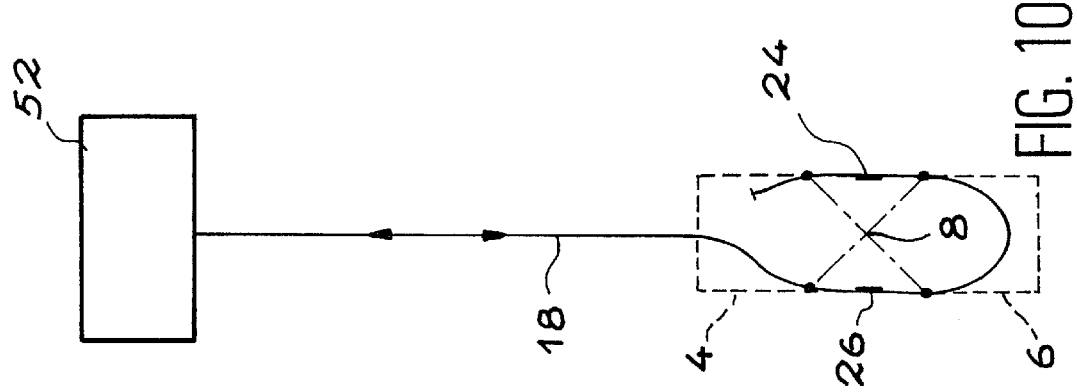

In a simpler embodiment (FIG. 10), one interrogates the Bragg gratings by a single side of the optic fibre 18, the other side being free.

Figure 11:
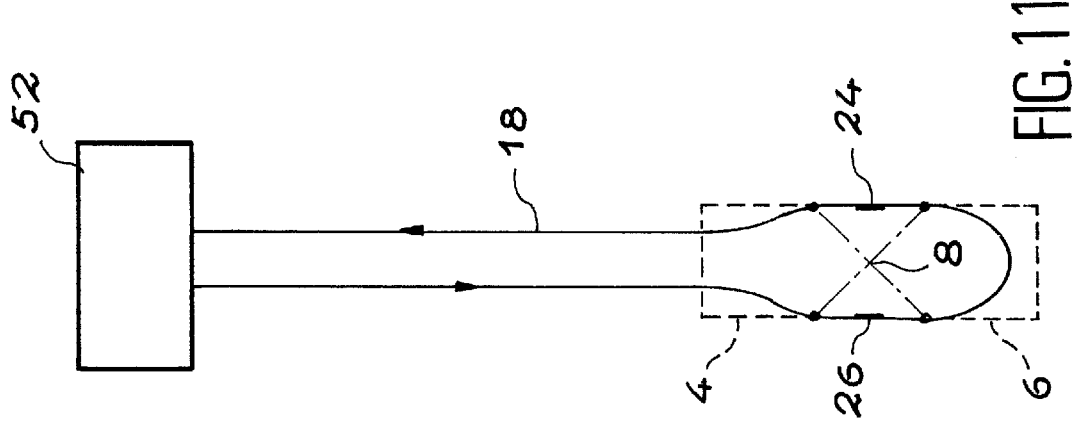
FIGS. 9, 10 and 11 schematically illustrate systems for measuring inclination variations using inclinometers according to the invention.

In another embodiment (FIG. 11), one sends the light into the Bragg gratings by one side of the optic fibre 18 and one recovers the possibly modified light by the other side of the optic fibre, in order to measure the inclination variations.

Figure 12:
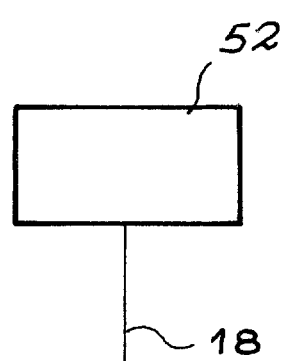
FIG. 12 is a schematic view of a system for measuring inclination variations in several zones using several inclinometers according to the invention, assembled in series.
Figure 12:
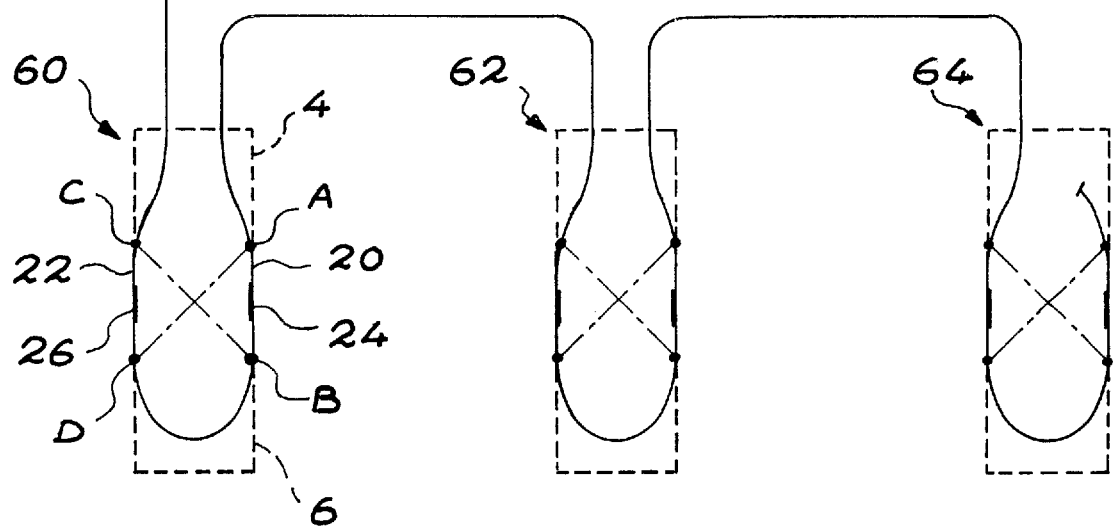

FIG. 12 shows a system of measuring inclination variations in different zones. This system comprises several inclinometers 60, 62 and 64 according to the invention (for example, like the one shown in FIG. 1), which are respectively placed in these different zones. Moreover, the same optic fibre 18 is common to all of said inclinometers, which are thus mounted in series by the intermediary of said fibre.

Figure 13:
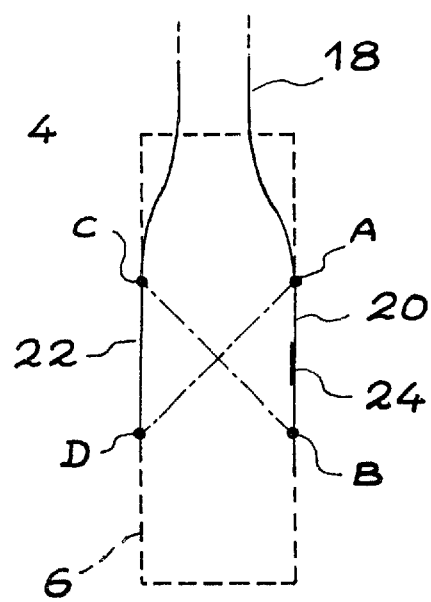
FIG. 13 very schematically illustrates an inclinometer according to the invention, using only a single Bragg grating, and FIGS. 14 and 15 very schematically illustrate inclinometers according to the invention, making it possible to measure inclinations that are definable by two angles of rotation.

FIG. 13 is a schematic view of an inclinometer according to the invention but without temperature compensation. This inclinometer is identical to the inclinometer in FIG. 1 (or 3), except that it only comprises a single Bragg grating, namely the Bragg grating 24, no grating being formed in the portion of fibre 22. Such an inclinometer can be used in places where the temperature remains substantially constant, for example in mines.

Figure 14:
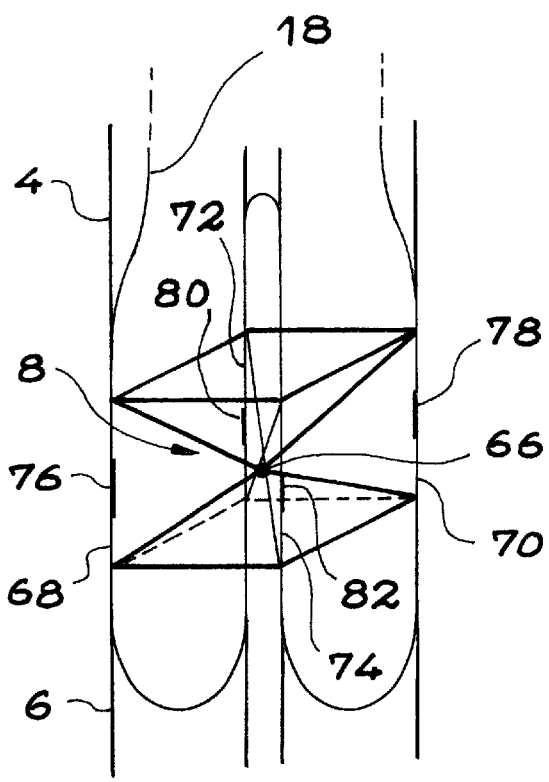

Another inclinometer according to the invention is schematically shown in FIG. 14. This involves an improvement to the inclinometer of FIG. 1, intended to measure inclination variations that can be defined by two angles of rotation (instead of a single angle in the case of FIG. 1).

In order to do this, instead of an axis of rotation, the articulation 8 of the inclinometer in FIG. 14 comprises a spherical joint 66 (or a Cadran type suspension). In addition, this inclinometer comprises not two portions of optic fibre but four portions of optic fibre 68, 70, 72 and 74, each subjected to a pre-tightening and respectively provided with four photo-induced Bragg gratings 76, 78, 80 and 82.

The portions of fibre 68 to 74 again belong to the same optic fibre 18.

In a cross-sectional view, these four portions form the summits of a square. One thus defines two perpendicular planes, each plane containing two Bragg gratings that are associated with each other. In the example shown, the Bragg gratings 76 and 78 are associated with each other and the gratings 80 and 82 are associated with each other.

In order to carry out inclination variation measurements, one uses four lights of different wavelengths $o_1, \lambda_2, \lambda_3$ and $\lambda_4$ that are sent in the optic fibre 18 and which are respectively associated with the Bragg gratings 76, 78, 80 and 82.

In the case where one does not need a temperature compensation (in a mine, for example), one uses an inclinometer according to that shown in FIG. 14, but without the Bragg gratings 78 and 82.

Figure 15:
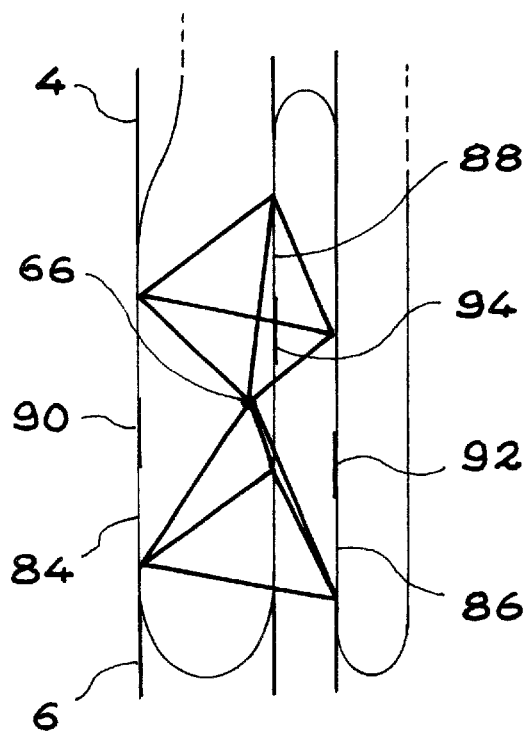

The inclinometer in FIG. 15 is an improvement on that of FIG. 14 and again uses the spherical joint 66 but only three portions of optic fibre 84, 86 and 88 which are each subjected to a pre-tightening and in which are respectively photo-induced three Bragg gratings 90, 92 and 94.

In a cross-sectional view, these three portions form the summits of an equilateral triangle.

In order to carry out inclination variation measurements with the inclinometer in FIG. 15, one uses three lights of different wavelengths $\lambda_1, \lambda_2$ and $\lambda_3$ that are sent in the optic fibre 18 (to which belongs the portions of fibre 84, 86 and 88) and which are respectively associated with the Bragg gratings 90, 92 and 94.

Indeed, the article by M. G. Xu et al., Inst. J. of Optoelectronics, 1994, vol 9, no 3, pages 281 to 283, describes a thermally compensated flexion gauge that uses, to achieve this, a pair of Bragg gratings. Said gratings are respectively formed in two portions of optic fibres. These portions are respectively bonded onto the upper and lower faces of a cantilevered beam.

Said document does not concern inclinometers. Moreover, the respective positions of the Bragg gratings after bonding cannot have the strict symmetry that is necessary for a differential measurement, due to a double bonding operation, in which the imperfections cannot be perfectly symmetrical, which leads to problems for measurements close to zero. It should be noted that, in the present invention, no portion of optic fibre, in which one has formed a Bragg grating, is bonded at the level of said grating: this portion is simply fastened at its two ends after being put under tension.

What is claimed is:

1. Inclinometer configured to measure an inclination variation of a structure, said inclinometer comprising:

an upper part configured to be rendered rigidly integral with the structure so that inclination of said upper part varies like that of the structure;

a lower part configured to be located below the upper part;

an articulation of the lower and upper parts, the lower part forming a pendulum freely suspended from the upper part by the articulation;

at least two portions of optic fiber placed on either side of said articulation, each portion of optic fiber having first and second ends respectively fastened to the lower and upper parts and previously put under tension between the lower and upper parts; and at least one Bragg grating formed in one of the two portions of the optic fiber, wherein any variation in inclination of the structure provokes a rotation of the upper part in relation to the lower part and induces, as a result, a stress on the Bragg grating, said Bragg grating configured to modify a light that propagates in a portion of optic fiber where said Bragg grating is located, variation in the inclination of the structure being determined from the light thereby modified by the Bragg grating.

2. Inclinometer according to claim 1, comprising at least two Bragg gratings, said at least two Bragg gratings being respectively formed in the at least two portions of optic fiber and thus undergoing respectively a tensile stress and a compressive stress during the variation of inclination of the structure, said at least two Bragg gratings configured to allow carrying out a differential measurement of wavelength.

3. Inclinometer according to claim 1, wherein the articulation of the lower and upper parts comprises an axis of rotation configured to be arranged horizontally during an inclination variation measurement.

4. Inclinometer according to claim 1 wherein the articulation of the lower and upper parts has at least two degrees of freedom of rotation, said inclinometer comprising at least three portions of optic fiber put under tension and placed around said articulation, and comprising at least two Bragg gratings, said at least two Bragg gratings being respectively formed in two of the three portions of optic fiber, the inclinometer configured to measure an inclination variation definable by two angles of rotation.

5. Inclinometer according to claim 4, wherein a third Bragg grating is formed in the third portion of optic fiber to obtain a third measurement, used to compensate effect of temperature.

6. Inclinometer according to claim 4, wherein the at least three portions of optic fiber are arranged at 120° in relation to each other around the articulation.

7. Inclinometer according to claim 4, comprising four portions of optic fiber put under tension and arranged at 90° in relation to each other around the articulation, and comprising at least two Bragg gratings, said at least two Bragg gratings being respectively formed in two of the four portions of optic fiber, and configured to allow measuring respectively the two angles.

8. Inclinometer according to claim 7, comprising four Bragg gratings, respectively formed in the four portions of optic fiber, each Bragg grating being associated with a respective oppositive of the Bragg gratings in relation to the articulation, said respective Bragg gratings enabling a differential measurement of wavelength.

9. Inclinometer according to claim 4, wherein the articulation comprises one of a spherical joint and a Cardan type suspension.

10. Inclinometer according to claim 1, comprising a single optic fiber to which belongs each portion of optic fiber.

11. Inclinometer according to claim 1, wherein said inclinometer is interrogated in reflection, by at least one of ends of the optic fiber in which is formed each of the at least one Bragg grating.

12. Inclinometer comprising a plurality of inclinometers according to claim 10, wherein said inclinometers are mounted in series through the optic fiber as an intermediary.

* * * * *